(12) United States Patent
Adam et al.

(10) Patent No.: US 7,575,814 B2
(45) Date of Patent: *Aug. 18, 2009

(54) LAMINATED COMPOSITE MATERIAL, PRODUCTION AND USE THEREOF

(75) Inventors: Achim Adam, Nauheim (DE); Klaus Staschko, Taunusstein-Seitzenhahn (DE)

(73) Assignee: Federal-Mogul Wiesbaden GmbH & Co. Kg., Weisbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/568,110

(22) PCT Filed: Aug. 5, 2004

(86) PCT No.: PCT/DE2004/001765

§ 371 (c)(1), (2), (4) Date: Feb. 13, 2006

(87) PCT Pub. No.: WO2005/015036

PCT Pub. Date: Feb. 17, 2005

(65) Prior Publication Data

US 2006/0263625 A1 Nov. 23, 2006

(30) Foreign Application Priority Data

Aug. 12, 2003 (DE) .................... 103 37 030

(51) Int. Cl.
*F16C 33/12* (2006.01)

(52) U.S. Cl. .............. 428/648; 428/652; 428/675; 428/680; 384/912

(58) Field of Classification Search .............. None

See application file for complete search history.

(56) References Cited

U.S. PATENT DOCUMENTS

| | | | | |
|---|---|---|---|---|
| 2,459,172 A | * | 1/1949 | Luetkemeyer et al. | 428/643 |
| 3,077,285 A | * | 2/1963 | Budininkas | 220/62.17 |
| 3,658,488 A | * | 4/1972 | Brown et al. | 428/613 |
| 3,950,141 A | * | 4/1976 | Roemer | 428/643 |
| 4,818,628 A | * | 4/1989 | Alexander et al. | 428/561 |
| 4,832,801 A | * | 5/1989 | Mori | 205/176 |
| 5,328,772 A | * | 7/1994 | Tanaka et al. | 428/548 |
| 5,434,012 A | * | 7/1995 | Tanaka et al. | 428/643 |
| 5,445,896 A | * | 8/1995 | Tanaka et al. | 428/647 |
| 6,309,759 B1 | * | 10/2001 | Tomikawa et al. | 428/642 |
| 6,510,726 B1 | * | 1/2003 | Subramanyan et al. | 73/7 |
| 7,368,046 B2 | * | 5/2008 | Adam et al. | 205/181 |
| 2001/0016267 A1 | * | 8/2001 | Huhn et al. | 428/647 |

(Continued)

FOREIGN PATENT DOCUMENTS

DE 3719789 A1 12/1988

(Continued)

*Primary Examiner*—John J Zimmerman
(74) *Attorney, Agent, or Firm*—Robert L. Stearns; Dickinson Wright PLLC

(57) ABSTRACT

The invention relates to the use of lead-free sliding layers in the laminated composite materials for slide bearings or bushes. According to the invention, the laminated composite material comprises a support layer, an antifriction layer (3) produced from a copper alloy or an aluminum alloy, an intermediate nickel layer (2) having a thickness >4 μm and a sliding layer (1) consisting of approximately 0 to 20% by weight of copper and/or silver and the remainder tin. The sliding layer is electrodeposited from a methlysulfonic acid electrolyte.

8 Claims, 2 Drawing Sheets

U.S. PATENT DOCUMENTS

| | | | |
|---|---|---|---|
| 2002/0031684 A1* | 3/2002 | Niegel et al. ................. | 428/675 |
| 2003/0048961 A1* | 3/2003 | Kawachi et al. ............. | 384/276 |
| 2004/0241489 A1* | 12/2004 | Kawachi et al. ............. | 428/642 |

FOREIGN PATENT DOCUMENTS

| | | | |
|---|---|---|---|
| DE | 3727591 A1 | 3/1989 | |
| DE | 19728777 A1 | 4/1999 | |
| DE | 19754221 A1 | 6/1999 | |
| JP | 11-050296 | * | 2/1999 |

* cited by examiner

⊢——⊣ 10 μm

LAMINATED COMPOSITE MATERIAL, PRODUCTION AND USE THEREOF

BACKGROUND OF THE INVENTION

1. Field of the Invention

The invention relates to a composite multilayer material, in particular for plain bearings or bushings, having a backing layer, a bearing metal layer of a copper alloy or an aluminum alloy, a nickel intermediate layer and an overlay. In addition, the invention relates to uses for the composite multilayer material.

2. Related Art

Conventional composite multilayer materials with the structure comprising steel backing as backing layer, lead-bronze as bearing metal layer and overlay of lead-tin-copper, as described for example in Glyco-Ingenieurberichte 1/91 (Glyco Engineering Reports 1/91), have proven themselves as a result of their high reliability and mechanical load carrying capacity. In such a structure, the overlay is electrodeposited. Such an overlay is a multifunctional layer, in which foreign particles may be embedded, which serves as corrosion protection, which exhibits emergency running characteristics and which is particularly suitable for running-in or mutual conforming of the sliding partners.

The bearing metal layer also exhibits adequate emergency running characteristics, in case the overlay is completely worn away at least in places.

Conventional composite multilayer materials comprise a lead-based overlay, a common alloy being for example PbSn10Cu2. Such overlays exhibit low hardnesses of around 12-15 HV (Vickers Hardness), for which reason they have good embedding properties and are insensitive to seizure.

For reasons of industrial safety and environmental protection, it is nonetheless desirable to replace the lead, which is a heavy metal, with other suitable materials.

One approach is to use hard layers as overlays in heavily loaded bearing systems. For example, aluminum-tin layers with hardnesses of around 80 HV are deposited using PVD (physical vapor deposition) methods. These are lead-free, but are very expensive to produce. Such bearings are highly wear-resistant, but they exhibit almost no embeddability and are therefore generally combined with soft, lead-containing layers as a counter-shell. However, it is also desirable to replace the lead in counter-shells with other materials.

Attempts have been made to use pure tin as a sliding surface. With a hardness of roughly 10 HV, however, pure tin is even softer than the conventional lead alloys and is therefore incapable of absorbing the loads which arise for example in crankshaft main bearings and connecting rod bearings.

DE 197 28 777 A1 describes a composite multilayer material for sliding elements, the overlay of which consists of a lead-free alloy comprising tin and copper, wherein the copper content amounts to 3-20 wt. % and the tin content to 70-97 wt. %. The addition of copper increases the hardness of the overlay relative to pure tin. This overlay is electrodeposited by means of a methylsulfonic acid electrolyte with grain refining additives. The overlay produced in this way has the characteristics of ternary lead-based overlays. In order further to improve wear resistance, DE 197 28 777 A1 additionally proposes providing hard material particles dispersed in the electrolyte bath, these being incorporated into the layer. However, this is associated with additional effort and cost. Between the bearing metal and the overlay it is possible to provide a 1-3 μm thick nickel layer together with a 2-10 μm thick nickel-tin layer as diffusion barrier layer.

DE 197 54 221 A1 discloses a composite multilayer material with an overlay comprising 3-30 wt. % copper, 60-97 wt. % tin and 0.5-10 wt. % cobalt. In this way, the mechanical load carrying capacity is further increased and embrittlement of the bonding layer between overlay and nickel diffusion barrier layer is prevented. The cobalt reduces the tendency of the tin to diffuse towards the nickel. The addition of cobalt to the alloy, however, makes the electrodeposition process more complex, which reduces process reliability. Furthermore, as in DE 197 28 777 A1 the 1-3 μm thick nickel layer may be combined with a 2-10 μm thick nickel-tin layer as diffusion barrier.

EP 1 113 180 A2 describes a composite multilayer material for plain bearings, whose overlay has a tin matrix into which tin-copper particles are incorporated, said particles consisting of 39-55 wt. % copper with the rest being tin. A characteristic feature of the composite multilayer material is, in addition, that not only is an intermediate layer of nickel of a thickness of 1-4 μm provided, but also a second 2-7 μm thick intermediate layer of tin and nickel is arranged between the nickel intermediate layer and the overlay. The first intermediate layer of nickel is applied onto the bearing metal layer from a Watt's nickel electrolyte. A second intermediate layer consisting of nickel and tin is electroplated onto this first intermediate layer. A modified chloride/fluoride electrolyte is used for this purpose. By means of the intermediate layers of nickel and tin-nickel, a system is produced which adapts itself to the load applied, load carrying capacity being increased, according to thermal conditions, by growth of the tin-nickel layer.

The object of the present invention is to overcome the disadvantages of the prior art.

SUMMARY OF THE INVENTION

It has surprisingly emerged that a tin-nickel layer forms slowly even if one is not present initially. When the composite multilayer material is heated, as occurs in bushings and bearings made from the composite multilayer material according to the invention, for example, in the running-in phase, nickel diffuses into the overlay consisting substantially of tin. In this way, a higher strength surface slowly forms as a result of the increasing concentration of a second hard phase of copper-tin and/or silver-tin contained in the tin matrix. The reduction in the supporting layer thickness increases fatigue strength.

In contrast to the prior art, according to which thin nickel layers of 1-3 μm were applied, which served as diffusion barriers, the nickel layer according to the invention forms a nickel source for formation of the initially absent tin-nickel layer. The nickel layer has to be thicker than 4 μm, since otherwise the nickel layer could be completely consumed by the diffusion of the nickel into the tin layer. This would lead to detachment of the top layers now consisting of tin-nickel and the tin overlay alloy. Thicker nickel layers have been avoided as far as possible, since they do not have good sliding characteristics and are intended, if necessary, to allow wear quickly to reach the bearing metal beneath them.

The metals copper and silver may be present separately or in combination in the tin matrix. Their total content should amount to between approximately 0.5 and 20 wt. %. Advantageously, the total content of copper and/or silver should amount to between approximately 2 and 8 wt. %.

The overlay should advantageously exhibit a layer thickness of approximately 5-25 μm. Layer thicknesses of approximately 4-8 μm are preferred for the nickel intermediate layer as are layer thicknesses of approximately 6-14 μm for the overlay. With layer thicknesses of these orders of magnitude, it is ensured that neither the nickel layer nor the tin-based overlay is completely converted as a result of diffusion. This would lead to problems of adhesion or undesired interactions such as brittle phase formation between the tin contained in the overlay and the bearing metal.

Advantageously, the bearing metals are copper-aluminum, copper-tin, copper-tin-lead, copper-zinc, copper-zinc-silicon, copper-zinc-aluminum, copper-aluminum-iron or copper-zinc alloys. Copper- or aluminum-based bearing metals are preferred, i.e. bearing metals whose copper or aluminum content is between 50 and 95 wt. %.

To produce the composite multilayer material according to the invention, the intermediate layer of nickel is applied in a first step chemically or electrochemically to a composite of steel and bearing metal. The overlay is then deposited from a binary or ternary alkylsulfonic acid electroplating bath with the addition of non-ionic wetting agents and free alkylsulfonic acid. When producing bearings, first of all the bearings are prefabricated from the composite of steel and bearing metal, the intermediate layer of nickel and the overlay being applied in further steps.

The composite multilayer material according to the invention exhibits the great advantage that an interdiffusion layer of tin and nickel forms by itself during running-in under operating conditions of bearings and bushings made from the multilayer material, with the interdiffusion layer increasing wear resistance. It does not have to be applied separately in a separate process step. It is possible to encourage the interdiffusion layer to arise by artificial aging of the plain bearings or bushings. For this purpose, heat treatment at approximately 150°-170° C. has proven particularly useful, with the heat treatment proceeding for two or more hours, to a few days.

The composite multilayer material according to the invention is particularly suitable for the production of crankshaft main bearings and of connecting rod bearings, in particular for the large connecting rod eye.

DRAWINGS

The invention is explained in greater detail with reference to an Example and Figures, in which.

DETAILED DESCRIPTION

After appropriate pretreatment, a nickel diffusion barrier intermediate layer is applied from a Watt's nickel electrolyte onto a prefabricated bearing of a composite of steel and a bearing metal of CuPb22Sn. A tin-based overlay is electrodeposited onto the nickel intermediate layer produced in this way. The following aqueous-based electrolyte system is used for this purpose:

| | |
|---|---|
| 30-45 g/l | $Sn^{2+}$ as tin methanesulfonate |
| 2-8 g/l | $Cu^{2+}$ as copper methanesulfonate |
| 0.1-2 g/l | $Ag^+$ as silver methanesulfonate |
| 80-140 g/l | methanesulfonic acid |
| 30-45 g/l | additive "N" (Cerolyt BMM-T) |
| 1.5-4 g/l | resorcinol |

Tin is used as anode material. The bath temperature for deposition of the overlay is 20-40° C. The current density used is $1.5\text{-}3.0 \times 10^{-2}$ A/m². The distance between the anode and the cathode amounts to between approximately 300 and 400 mm. The anode to cathode surface area ratio should be substantially 1:1 (+/−10%). In order continuously to remove $Sn^{4+}$ as it arises, the electrolyte has to be circulated via a filtration plant.

Figure 1:
FIG. 1 shows a section through a bearing metal layer, nickel intermediate layer and overlay of a composite multilayer material according to the invention.

FIG. 1 is a sectional image of the layer structure of a composite multilayer material obtained as described above with a copper-tin overlay. 1 designates the overlay of copper-tin of a thickness of 13.1 μm, 2 being the nickel intermediate layer of a thickness of 4.9 μm and 3 being the bearing metal comprising CuPb22Sn.

The boundary line between the two layers 1 and 2 is shown clearly as a pale line.

Figure 2:
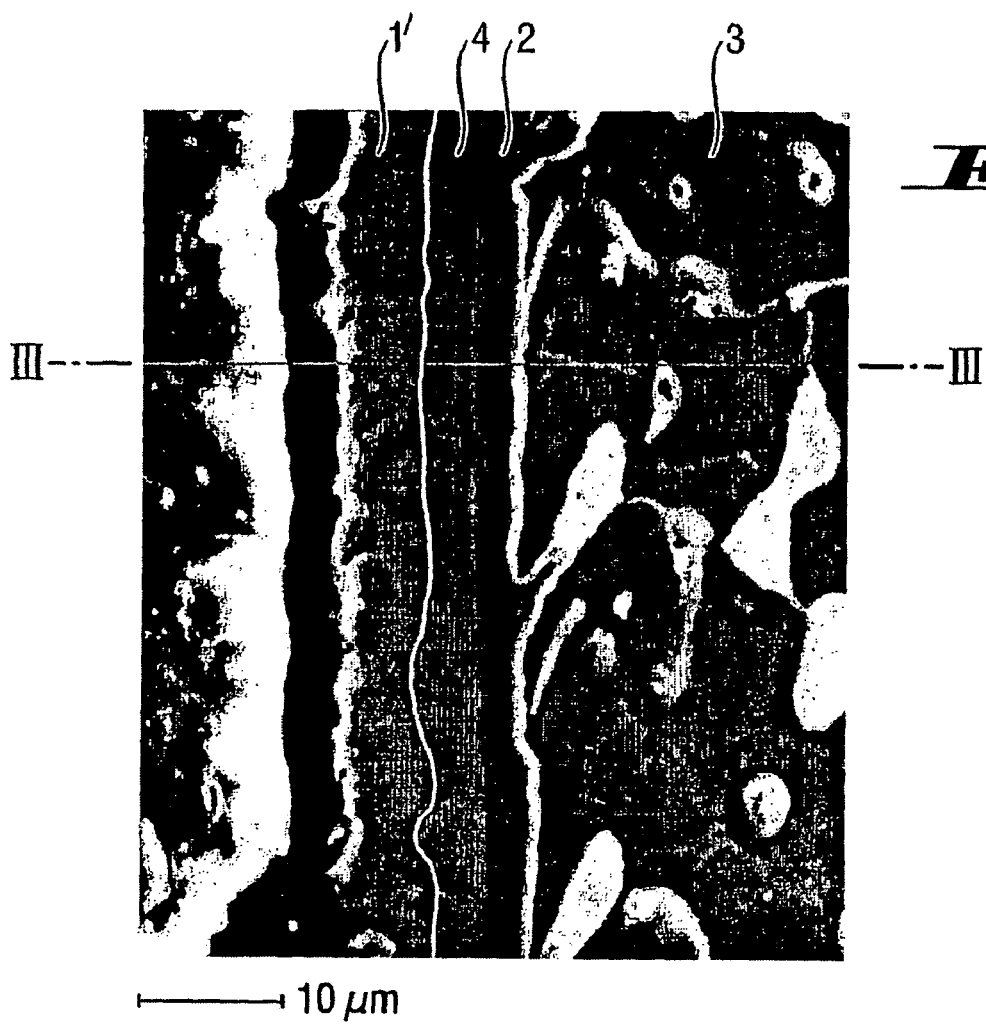
FIG. 2 shows a section through a bearing consisting of the composite multilayer material according to the invention after the running-in phase.
Figure 3:
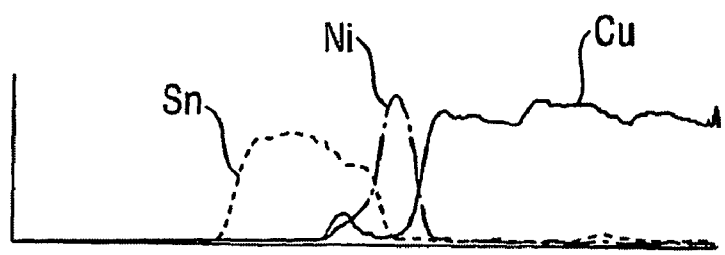
FIG. 3 show the element distribution determined for the bearing according to FIG. 2 in the area III-III by energy-dispersive X-ray analysis.

FIG. 2 is a sectional image of a bearing of the composite multilayer material shown in FIG. 1 after the operating state has been established, i.e. after the running-in phase. To this end, the bearing was heat-treated for 500 hours at 150° C. The tin-nickel layer of a thickness of 4.1 μm designated 4 has arisen by diffusion, the layer 4 resulting in a more wear-resistant sliding surface with a greater load carrying capacity. That said, layer 4 is a tin-nickel layer, which is confirmed by the energy-dispersive X-ray analysis results illustrated in FIG. 3. The distances on the X axis match the corresponding layer thicknesses in the area III-III of FIG. 2. The overlay 1' and the nickel layer 2 now have slightly smaller thicknesses of 10.2 μm and 3.3 μm respectively. The boundary line between the two layers 1' and 4 in FIG. 2 is shown clearly as a pale line.

Underwood tests were carried out to assess the performance of bearings made from the composite multilayer material according to the invention. In these tests, a shaft with eccentric weights rotates in rigidly mounted connecting rods. The bearing system in the connecting rods takes the form of the test bearings. The test bearings have a wall thickness of 1.4 mm and a diameter of 50 mm. The specific load is adjusted over the bearing width. The speed of rotation amounts to 4000 rpm. Overlay fatigue and wear were measured after 250 hours of continuous operation. The results obtained in this test are listed in Table 1 (Example Nos. 5-8). For the purpose of comparison, the values are also indicated which are achieved with materials according to the prior art (Examples 1-4).

As is clear from the results listed in Table 1, the bearings made from composite multilayer material according to the invention are markedly superior to the conventional bearings with a lead-based overlay with regard to overlay fatigue, wear and maximum load to total wear. Even the bearing with a pure tin overlay (Example 5) becomes almost comparable, with a thick nickel layer, to the bearings with lead-containing overlay and may be used for lighter loads.

TABLE 1

|  | Prior art | | | Ex. No. | According to the invention | | | |
| --- | --- | --- | --- | --- | --- | --- | --- | --- |
|  | 1 | 2 | 3 | 4 | 5 | 6 | 7 | 8 |
| Composition | PbSn5Cu2 | PbSn10Cu5 | PbSn14Cu8 | Sn | Sn | SnCu6 | SnAg3 | SnCu3Ag2 |
| Thickness of Ni layer in μm | 1 | 2 | 1.5 | 1 | 5 | 4.5 | 5.5 | 4.5 |
| Max. load in MPa without overlay fatigue | 52.5 | 60 | 65 | 35 | 50 | 70 | 67.5 | 72.5 |
| Wear in μm at 60 MPa | 15 | 11 | 9 | not measurable | 12 | 6 | 8 | 6 |
| Max. load in MPa to total wear of overlay | 60 | 67.5 | 80 | 45 | 65 | 85 | 82.5 | 85 |

The invention claimed is:

1. A composite multilayer material, in particular for plain bearings or bushings, having a backing layer, a bearing metal layer of a copper alloy or an aluminum alloy, an intermediate layer and an overlay, wherein the overlay consists of about 0-20 wt. % of at least one of copper or silver, the rest being tin, and said intermediate layer being a single layer of nickel in direct contact with said bearing metal layer and said overlay for diffusion of a portion of said single layer of nickel of said intermediate layer directly into said overlay to form an initially absent tin-nickel layer between a remaining portion of said single layer of nickel and said overlay, the layer thickness of the intermediate nickel layer being greater than 4 μm as applied to said bearing metal layer.

2. The composite multilayer material as claimed in claim 1, wherein the overlay comprises at least 0.5-20 wt. % of at least one of copper or silver.

3. The composite multilayer material as claimed in claim 1, wherein the overlay comprises about 2-8 wt. % of at least one of copper or silver, the rest being tin.

4. The composite multilayer material as claimed in claim 1, wherein the layer thickness of the overlay is about 5-25 μm.

5. The composite multilayer material as claimed in claim 1, wherein the layer thickness of the overlay is about 6-14 μm.

6. The composite multilayer material as claimed in claim 1, wherein the bearing metal layer comprises at least one of copper-aluminum, copper-tin, copper-tin-lead, copper-zinc, copper-zinc-silicon, copper-zinc-aluminum, aluminum-zinc or copper-aluminum-iron alloy.

7. The composite multilayer material as claimed in claim 1, which has undergone an aging process and comprises an interdiffusion layer of substantially tin and nickel between the nickel intermediate layer and the overlay.

8. A composite multilayer material, in particular for plain bearings or bushings, having a backing layer, a bearing metal layer of a copper alloy or an aluminum alloy, an intermediate layer and an overlay, wherein the overlay consists of about 0-20 wt. % of at least one of copper or silver, the rest being tin, and said intermediate layer being a single layer of nickel in direct contact with said bearing metal layer and said overlay for diffusion of a portion of said single layer of nickel of said intermediate layer directly into said overlay to form an initially absent tin-nickel layer between a remaining portion of said single layer of nickel and said overlay, the layer thickness of the intermediate nickel layer being about 6 μm-8 μm as applied to said bearing metal layer.

* * * * *